(12) United States Patent
Detert et al.

(10) Patent No.: US 9,677,920 B2
(45) Date of Patent: Jun. 13, 2017

(54) AUTOMATION DEVICE AND METHOD FOR REDUCING JITTER

(71) Applicant: PHOENIX CONTACT GMBH & CO.KG, Blomberg (DE)

(72) Inventors: Volker Detert, Kirchlengern (DE); Christoph Rotter, Vienna (AT)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 14/779,299

(22) PCT Filed: Apr. 1, 2014

(86) PCT No.: PCT/EP2014/056529
§ 371 (c)(1),
(2) Date: Sep. 22, 2015

(87) PCT Pub. No.: WO2014/161854
PCT Pub. Date: Oct. 9, 2014

(65) Prior Publication Data
US 2016/0048156 A1    Feb. 18, 2016

(30) Foreign Application Priority Data

Apr. 5, 2013  (DE) .......................... 10 2013 005 748

(51) Int. Cl.
*G06F 1/12*      (2006.01)
*G06F 1/04*      (2006.01)
(Continued)

(52) U.S. Cl.
CPC ............... *G01F 1/12* (2013.01); *G05B 19/05* (2013.01); *G06F 1/14* (2013.01);
(Continued)

(58) Field of Classification Search
CPC .......... H04L 67/1095; H04L 67/1097; H04W 56/001; G06F 9/52; G06F 1/12; G06F 9/4812; G06F 17/30174
(Continued)

(56) References Cited

U.S. PATENT DOCUMENTS 5,988,846 A   11/1999  Flamm et al.
7,995,620 B2  8/2011   Schirmer et al.

FOREIGN PATENT DOCUMENTS

DE    19539519 A1    5/1996
DE    19626287 A1    2/1997
(Continued)

OTHER PUBLICATIONS

International Preliminary Report on Patentability with Written Opinion for International Application No. PCT/EP2014/056529 dated Oct. 6, 2015 (8 pgs.).
(Continued)

*Primary Examiner* — Michael J Brown
(74) *Attorney, Agent, or Firm* — Maldjian Law Group LLC

(57) ABSTRACT

An automation device is provided, which comprises an operating system having a first system clock and a communication system having a second system clock. The first system clock is intended to control a system time cycle of the operating system, and the second system clock is intended to control a system time cycle of the communication system. Furthermore, the first system clock and the second system clock are synchronized in time.

20 Claims, 5 Drawing Sheets

(51) Int. Cl.
| | | |
|---|---|---|
| *G06F 13/42* | (2006.01) | |
| *G01F 1/12* | (2006.01) | |
| *G05B 19/05* | (2006.01) | |
| *G06F 1/14* | (2006.01) | |
| G06F 17/30 | (2006.01) | |
| H04L 29/08 | (2006.01) | |
| G06F 9/52 | (2006.01) | |
| H04W 56/00 | (2009.01) | |
| G06F 9/48 | (2006.01) | |

(52) U.S. Cl.
CPC .... *G05B 2219/1211* (2013.01); *G06F 9/4812* (2013.01); *G06F 9/52* (2013.01); *G06F 17/30174* (2013.01); *H04L 67/1095* (2013.01); *H04L 67/1097* (2013.01); *H04W 56/001* (2013.01)

(58) Field of Classification Search
USPC ........................................ 713/400, 401, 503
See application file for complete search history.

(56) References Cited

FOREIGN PATENT DOCUMENTS

| | | |
|---|---|---|
| DE | 10038915 A1 | 2/2002 |
| DE | 10336585 A1 | 3/2005 |
| DE | 102006013640 A1 | 9/2007 |
| EP | 2 110 754 A1 | 10/2009 |

OTHER PUBLICATIONS

International Search Report issued in connection with corresponding International Application No. PCT/EP2014/056529 mailed May 12, 2014 (12 pages total).

AUTOMATION DEVICE AND METHOD FOR REDUCING JITTER

FIELD

In automation technology it can be observed that demands on control equipment, such as e.g. a PLC (Programmable Logic Controller) are constantly increasing. Shorter and shorter cycle times are required for both the PLC program and for real-time communication systems by means of which process data are transmitted to a fieldbus device. Ethernet based systems are increasingly used, replacing the fieldbus systems such as the bus systems of the Interbus or PROFIBUS type previously employed.

BACKGROUND

Automation devices have a plurality of communication layers, for example a data bus as one layer, a communication system as a next higher layer, above that an application layer, and an operating system as the highest layer. Today's communication systems often allow to synchronize a plurality of communication subscribers with one another. Such communication is known from document EP 2 110 754 A1, for example, which proposes a method for synchronizing bus users as the communication subscribers of an open automation system.

Synchronization of communication subscribers may, for example, be implemented according to the IEEE 1588 standard, and often a synchronization in form of a so-called clock-synchronized or isochronous synchronization is employed. In isochronous synchronization, a local clock system or a plurality of local clock systems of communication subscribers is matched and thus synchronized. This means that after synchronization all communication subscribers have the same time base. Further timing required for synchronous communication can be derived from this time base.

In automation devices with synchronized communication subscribers, collisions in terms of communication may occur. One reason for this may be such applications as motion control, for example. Such motion control requires both short cycle times of the application and short cycle times of the communication system. Advantageously, both systems, the application system and the communication system are additionally synchronized with each other. If such synchronization is lacking, jitter may increase, which may degrade overall system performance. Jitter refers to interferences which cause a slight variation in accuracy of the transmission clock, and such jitter is noticeable as a clock jittering over time during the transmission of digital signals. Jitter may arise despite of a synchronization between application system and communication system, since with a real-time operating system in an automation device preferably an interrupt is used to establish such synchronization. In that case, mutual interference of interrupts may occur.

Thus, there is a need for an automation device and method in which the occurrence of jitter is further reduced.

SUMMARY

In one embodiment of the present invention, an automation device is provided which comprises an operating system with a first system clock and a communication system with a second system clock, wherein the first system clock is intended for controlling a system time cycle of the operating system, and the second system clock is intended for controlling a system time cycle of the communication system. Furthermore, the first system clock and the second system clock are synchronized in time.

Furthermore, In another embodiment of the invention there is provided a method for operating an automation device, which comprises an operating system and a communication system, by contemplating to provide a first system clock and to provide a second system clock. The first system clock defines an operating cycle of the operating system, and the second system clock defines an operating cycle of the communication system. It is furthermore contemplated that the method comprises synchronizing the first system clock and the second system clock.

Synchronized in time means that the two systems, the operating system and the communication system, are matched to each other. This is effected in predefined time cycles in a manner so that interrupts generated by the operating system, for example, and interrupts generated by the communication system do not interfere with each other. By avoiding such interference, jitter is reduced in turn. An interrupt is to be understood as a short-term interruption of normal program execution in order to perform another, usually short but time-critical processing. An interrupt request (IRQ) is the triggering event for an interrupt. The following figures illustrate timings of an interrupt request (IRQ) which causes an interrupt. A program following an interrupt request for executing the other processing, such as a PLC program, can be considered as an interrupt service.

BRIEF DESCRIPTION OF THE DRAWINGS

The state of the art and the concept of the invention will now be explained with reference to the accompanying figures, wherein.

DETAILED DESCRIPTION

Figure 1:
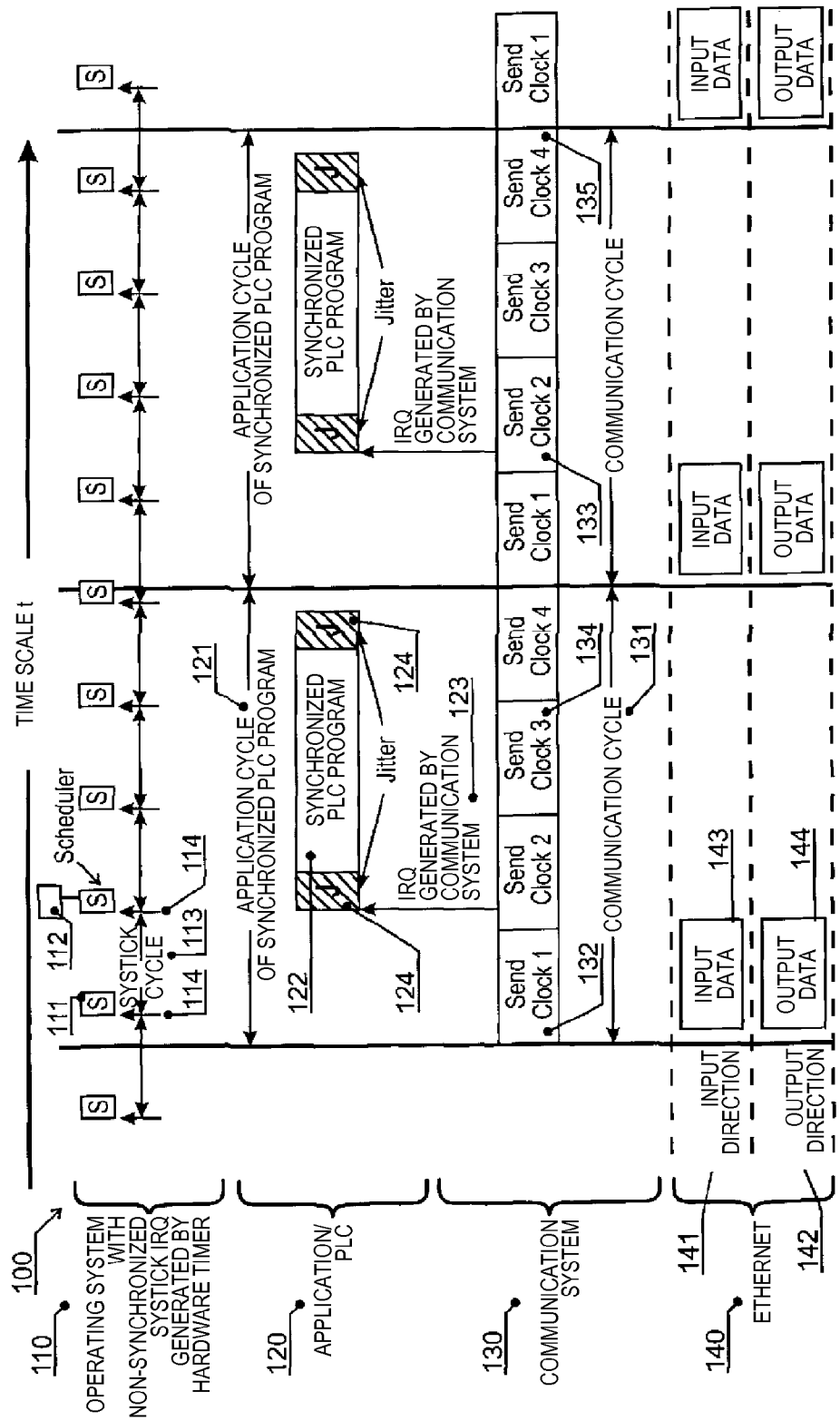
FIG. 1 is a prior art automation device comprising a non-synchronized operating system clock.

FIG. 1 shows an exemplary embodiment of an automation device comprising a non-synchronized operating system clock according to the prior art. The automation device 100 as shown in FIG. 1 comprises several communication layers. The highest layer is defined by an operating system 110. In an underlying layer, application layer 120, an application 122 is executed. Below application layer 120 there is a communication system 130, and below that an Ethernet bus 140 having an input direction 141 and an output direction 142, with input data 143 being transferred in the input direction, and output data 144 being transferred in the output direction 142.

What takes place in FIG. 1 is a non-synchronized operation between the communication system 130 and the operating system 110, as is currently usual in the art. A system clock and associated system interrupts of the operating system 110 are generated in a part of the operating system 110 by means of a scheduler 111, which scheduler 111 in turn is connected to a hardware timer 112. For every system cycle 113, also referred to as systick cycle, a scheduler 111 is schematically shown in FIG. 1, which is illustrated repeatedly and which may be implemented in form of software. Hardware timer 112 generates a system clock, also known as system tick, so that at regular intervals an interrupt 114 can be generated in the operating system layer 110 and can be further used in the operating system 110. System tick cycle 113 (SYSTICK CYCLE) defines the time interval between two respective interrupts 114.

Each operating system call-up results in the execution of the operating system scheduler 111. In addition, however, a so-called system tick is required which ensures cyclic control of the scheduler 111 and thus is the time base of a real-time operating system. This system tick is usually implemented with a cyclic interrupt which is provided by a hardware timer. In a conventional automation device 100, the clock system by means of which this hardware timer 112 is operated, is not synchronized with the clock system of the communication system 130. Therefore, the clock systems run at different speeds and continuously drift relative to one another.

Furthermore, at application layer 120 FIG. 1 shows an application cycle 121 during which the PLC program 122 is executed. This PLC program 122 is again started by an interrupt 123, which interrupt 123 is generated from a system clock of the communication system 130. In FIG. 1, a communication cycle 131 has four time blocks 132, 133, 134, 135 of equal length, each of which may generate one or more interrupts 123. Together, the four time blocks 132, 133, 134, 135 define the communication cycle 131.

In the automation system 100 of FIG. 1, besides time-critical applications such as motion control, programmable logic controllers also drive other applications at the same time, that are less time-critical. Examples of less time-critical applications are visualizations, for example of automation processes, or acquisition of operational data, for example for evaluating measured data. Because of the time-critical applications, automation device 100 often employs an operating system 110 that operates in real time. Such real-time operating systems 110 typically include additional real-time capabilities which, for example, allow for unconditional adherence to time constraints and predictability of process behavior.

The prior art real-time operating systems 110 in automation devices 100, such as exemplified in FIG. 1, use the interrupt (IRQ) 123 to establish synchronization between the communication system 130 and the application 122, e.g. the PLC program as an application 122. This interrupt 123 may be generated by communication system 130, for example based on the IEEE 1588 standard. Such an interrupt 123 leads to the execution of a so-called interrupt service under the control of real-time operating system 110. This interrupt service 122 causes execution of the PLC program. In this case, the PLC program 122 may be executed directly in a so-called interrupt service thread, or execution thereof may be caused by an event mechanism of the operating system 110. The interrupt service thread gets an appropriately high priority within automation device 100, so that time constraints are adhered to and predictability of the process behavior is ensured.

Because of the non-synchronized behavior of the operating system 110 with respect to the communication system 130, however, communication conflicts may occur since interrupts 114 of the operating system 110 are processed with a higher priority than interrupts 123 of the communication system 130. The execution of interrupt services is triggered by a respective interrupt 114, 123, and is executed with the priority of the respective interrupt. Thus, there are two different clock systems which are not synchronized with each other, namely a first system clock based on the system cycle 113 of the operating system 110 and a second system clock based on the communication cycle 131 of the communication system 130. The first system clock refers to the recurring start of system cycles 113. The second system clock refers to the recurring start of communication cycles 131. The two clock systems run at different speeds and continuous drift relative to each other. Although the PLC program 122 is synchronized to the communication system 130, namely by an interrupt that is generated by communication system 130, jitter is produced. Parts of the operating system, even if it is only the scheduler 111, work with a higher priority than the interrupt service thread 123 and may therefore displace the interrupt service thread 123. As a result, the service thread is started late or is interrupted. This happens because due to the lack of synchronization of the clock systems, the timing of execution of the interrupt service thread 123 and of the operating system scheduler 111 will occasionally coincide. This is because the clock systems are drifting relative to each other. Consequently, it is only a matter of time before times will coincide, at which an interrupt 114 of the operating system 110 will come into conflict with an interrupt 123 of the communication system 130.

In FIG. 1, jitter 124 is resulting during the execution of PLC program 122, which is shown at the beginning and at the end of PLC program 122. This jitter 124 is generated by collisions between interrupts 114 from operating system 110 and interrupts 123 from communication system 130. This jitter 124 is undesirable and is minimized or even avoided in embodiments according to the invention.

Figure 2:
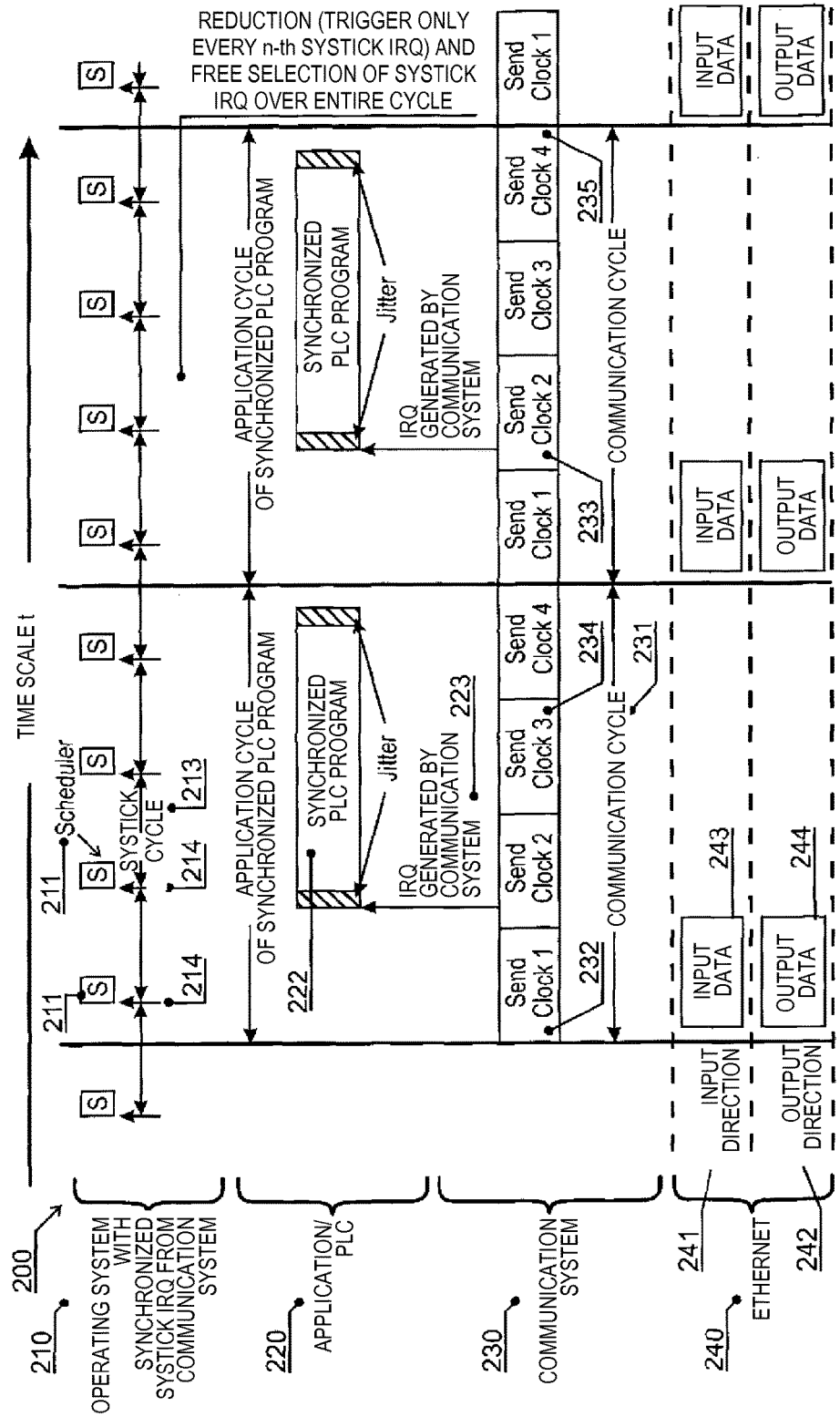
FIG. 2 shows an exemplary embodiment of an automation device according to the invention with a synchronized operating system clock.

FIG. 2 shows, similar to FIG. 1, a configuration of an automation device 200 comprising an operating system 210, an application layer 220, an underlying communication system 230, and an Ethernet bus 240 having an input direction 241 and an output direction 242, with input data 243 being transferred in the input direction 241 and output data 244 being transferred in the output direction 242.

In FIG. 2, an automation device 200 is provided which comprises an operating system 210 having a first system clock and a communication system 230 having a second system clock. Here, the first system clock is intended for controlling a system time cycle 213 of the operating system 210, and the second system clock is intended for controlling a system time cycle 231 of the communication system 230. Here, the system time cycle 231 of the communication system 230 corresponds to a communication cycle 231 of communication system 230. Furthermore, the first system clock and the second system clock are synchronized in time. In this exemplary embodiment, the operating system 210 is a real-time operating system. This means that automation device 200 even enables to operate one or more time-critical applications, such as motion control or PLC control. In this case, all or at least a plurality of operations are executed virtually in parallel (multi-tasking) by the real-time operating system 210. The real-time operating system 210 controls the distribution of resources and resolves any arising conflicts. Applications 222 in application layer 220 may be executed in processes or threads with a higher or lower priority, according to the required real-time performance. The same applies to the operating system 210. The processes and threads are controlled by operating system scheduler 211 that decides which thread or process is to be started next, further processed, interrupted, or terminated. For this purpose, the scheduler 211 itself is advantageously operated with the highest priority, so that it is able to perform its tasks.

According to the invention, the clock system from which the operating system systick 213 is generated, is synchronized, in the present exemplary embodiment of FIG. 2 with the communication clock system and therefore also with communication cycle 231. Without any problem it is possible for the systick 213 to be no longer generated by means of a hardware timer, but to use an interrupt from communication system 230 for this purpose. The systick timing should be freely selectable over the entire communication cycle 231 in order to be able to determine and chose the best point in time. Also, a reduction (triggering only every n-th time) may be useful to be able to select different cycle times (integer divider) for the communication cycle 231 and the operating system systick 213.

Figure 5:
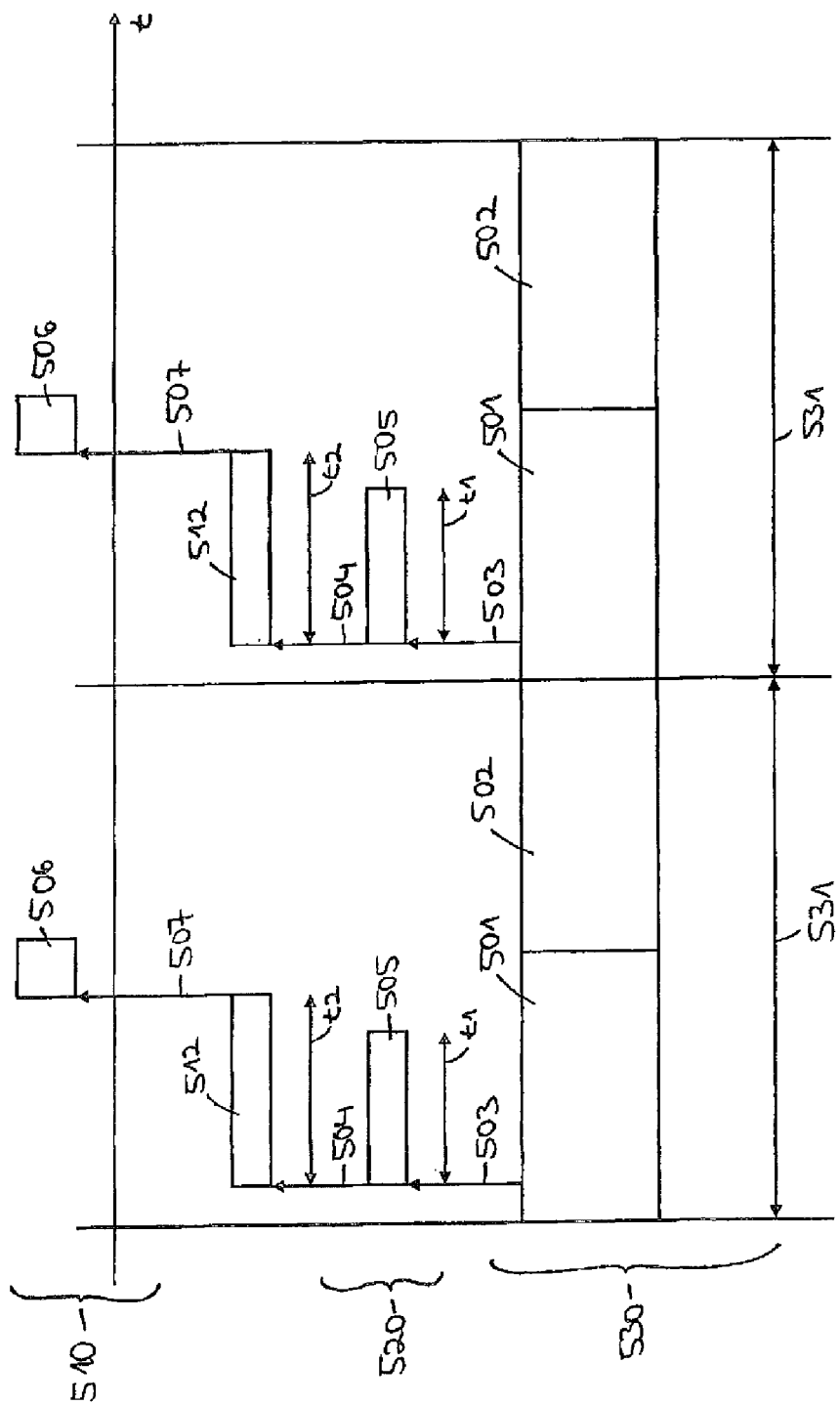
FIG. 5 shows a further exemplary embodiment for a synchronization between a communication system and an operating system.

If these adjustments are not easily feasible, because it is not possible to generate sufficiently different interrupts directly from the communication system 230, a hardware timer 512 with non-synchronized clock system, shown in FIG. 5, may be used. Hardware timer 512 may be operated in the so-called single shot mode, i.e. hardware timer 512 does not create a cyclic interrupt any more. Instead, hardware timer 512 is programmed once with a time duration t2 and is started. Upon expiry of duration t2, an interrupt 507 is triggered once by hardware timer 512, as shown in FIG. 5. The programming and starting of hardware timer 512 is effected in the service thread of communication interrupt 223, which provides for the execution of synchronized PLC program 222. Thus, the timing in communication cycle 231 can be freely determined here as well. A reduction is also implementable, by programming and starting the hardware timer 512 only every n-th time in the IRQ service thread.

When using a hardware timer 512 in the method according to the invention, a slightly increased inaccuracy of the so generated IRQ should be expected, since the basic clock system of the hardware timer 512 is still not synchronized. Nevertheless, continuous drifting can be excluded because the hardware timer 512 is repeatedly started at a synchronized point in time in every case. The non-synchronized clock system of hardware timer 512 only affects the programmed duration of hardware timer 512 itself. Additional optimization may be achieved here by measuring the actual duration of t2, as illustrated in FIG. 5, and correcting the programming of hardware timer 512 accordingly.

With the proposed method, jitter caused by the cyclic call-up of the operating system scheduler may be reduced or even completely avoided. The timings no longer drift relative to each other, so that a defined temporal relationship is ensured.

It may be envisaged in FIG. 2, that in the automation device 200 the first system clock and the second system clock are derived from communication system 230. More detailed exemplary embodiments for this case are given in FIGS. 3 to 5.

Figure 3:
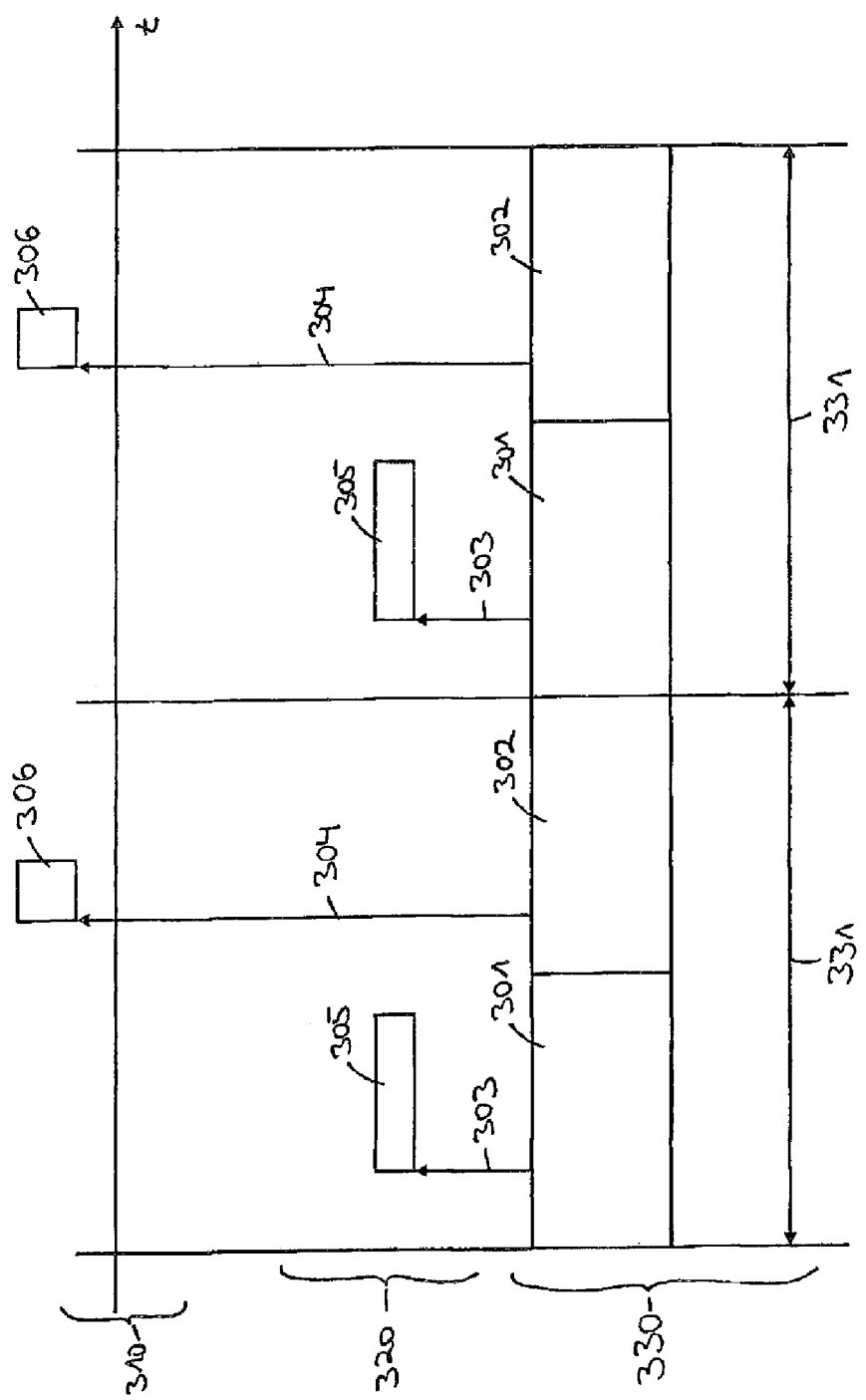
FIG. 3 shows an exemplary embodiment for a synchronization between a communication system and an operating system.
Figure 4:
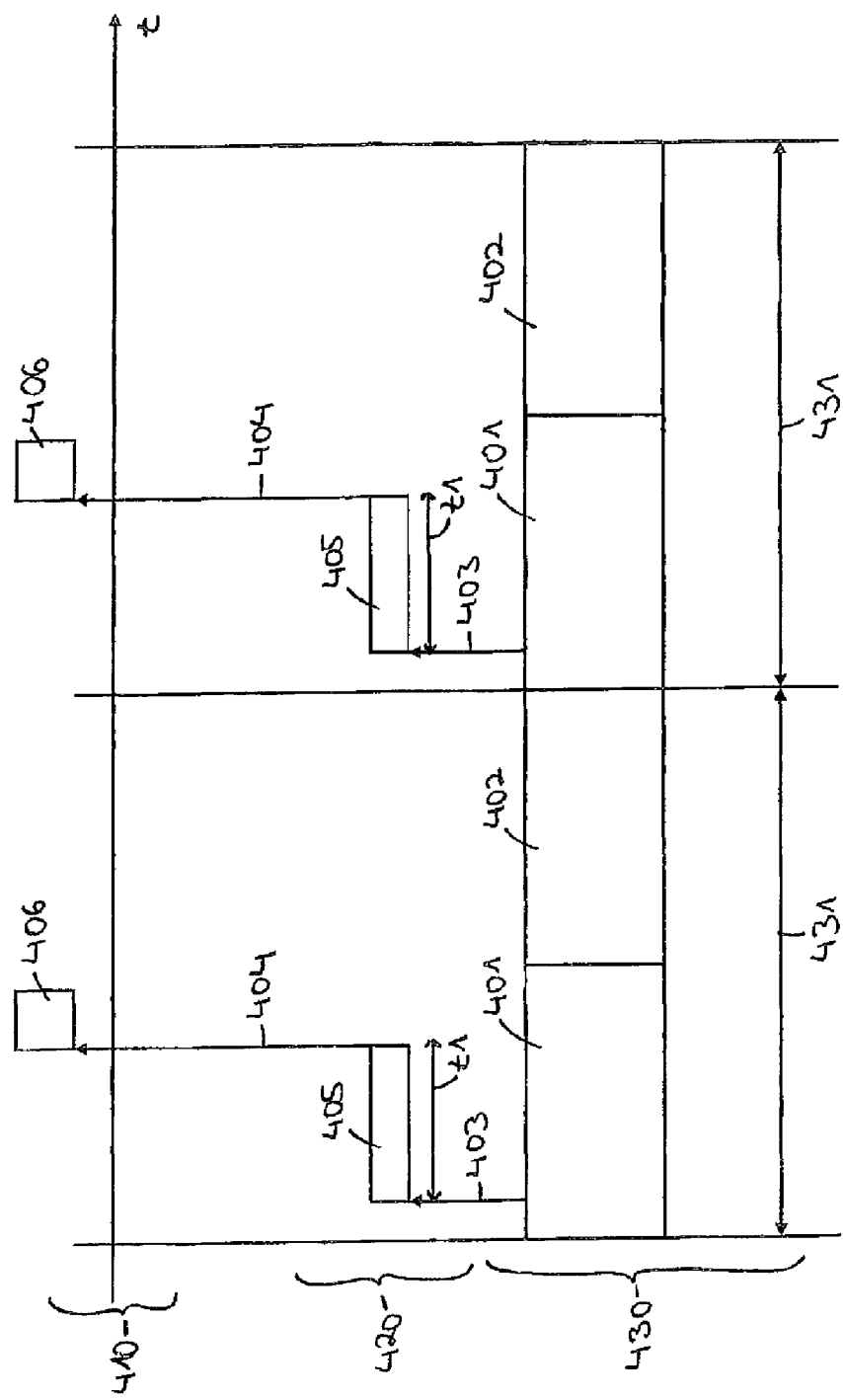
FIG. 4 shows another exemplary embodiment of synchronization between a communication system and an operating system.

In contrast to the exemplary embodiment of FIG. 1, synchronized operation is intended in the exemplary embodiment of FIG. 2, so that a system clock of operating system 210 is synchronized with a system clock of communication system 230. Like in FIG. 1, the operating system 210 of FIG. 2 comprises a scheduler 211 which is able to generate an interrupt 214 at regular intervals, so that a system cycle 213 of the operating system 210 is created. Also, like in FIG. 1, a communication cycle 231 has four time blocks 232, 233, 234, 235 of equal length, each of which can generate one or more interrupts 223. Interrupt 223 may start an application 222, such as a PLC program. The four time blocks 232, 233, 234, 235 together form the communication cycle 231. In contrast to FIG. 1, in FIG. 2 the operating system 210 is now synchronized with the communication system 230. Such synchronization implies that the operating system 210 and the communication system 230 are temporally matched to each other, for example by using a common clock source for both systems. Therefore, a free-running hardware timer 112 acting on scheduler 111 as shown in FIG. 1 is no longer used in the exemplary embodiment of FIG. 2 for scheduler 211, for example. A free-running hardware timer refers to a timer that is provided in form of hardware and works independently without control or synchronization from outside. Rather, according to the invention, the communication system 230 itself is used as a clock source for the operating system 210. For this case, the following FIGS. 3 to 5 illustrate different embodiments for implementing synchronization. Although a hardware timer 512 is provided in FIG. 5, this hardware timer 512 is controlled and triggered by software which in turn is controlled by a clock of the communication system.

FIG. 3 illustrates a first alternative for synchronization, in which each time block 301, 302 of the communication system 330 is able to trigger an interrupt 303, 304, wherein the first interrupt 303 from the first block 301 is used to start an application 305, while the second interrupt 304 from the second time block 302 is used to start scheduler 306 at operating system layer 310. As can be seen from FIG. 3, the first interrupt 303 and the second interrupt 304 alternately access different system layers, i.e. interrupt 303 accesses application layer 320 and interrupt 304 accesses operating system layer 310. Both the first interrupt 303 and the second interrupt 304 are generated from a system clock of communication system 330. In FIG. 3, a communication cycle 331 comprises two time blocks 301, 302 of equal length, each of which is able to generate one or more interrupts 303, 304. Both the first interrupt 303 and the second interrupt 304 are provided from a respective one of time blocks 301, 302 of the communication system 330. The first interrupt 303 is provided for application 305, and the second interrupt 304 is provided for operating system 310.

FIG. 4 shows a second alternative of how a synchronization between a communication system 430 and an operating system 410 may be achieved. Here, a communication interrupt 403 is started by starting the communication cycle 431, which interrupt triggers an application such as a PLC program 405 or a service thread in application layer 420 of a duration t1. At the end of duration t1, that is at the end of application 405, a second interrupt 404 is generated. The first interrupt 403 is generated from a system clock of communication system 430, and the second interrupt 404 which acts on the operating system 410 is generated from the application 405. In this case, the second interrupt 404 is provided by the application 405 for the operating system 410 by directly transmitting the second interrupt from the application 405 to the scheduler 406. In FIG. 4, a communication cycle 431 comprises two time blocks 401, 402 of equal length, each of which is able to generate one or more interrupts 403.

The exemplary embodiment of FIG. 4 ensures that there will not be any collisions of interrupts arising within automation device 200 of FIG. 2, because first the PLC program 405 is executed before a further interrupt 404 is enabled at the operating system layer 410. However, the embodiment of FIG. 4 may cause certain temporal fluctuations, since the duration t1 is varying, depending on the application. In this way, jitter 124 can be reduced but possibly not completely eliminated. For an improved embodiment, in order to avoid an impact of varying application lengths on the operating system 410, another alternative is provided in FIG. 5.

The automation device 200 of FIG. 2 may comprise a hardware timer 512 which is shown in the exemplary embodiment of FIG. 5. Hardware timer 512 is used for synchronizing the first system clock and the second system clock. As described for FIG. 4, an interrupt 503 of communication system 530 starts an application in form of a PLC program 505 of a length t1 in application layer 520. Within PLC program 505 another interrupt 504 is generated which starts the hardware timer 512, so that the latter allows a duration t2 to pass before another interrupt 507 is generated which is used in operating system layer 510. In FIG. 5, the second interrupt 504 for starting hardware timer 525 occurs almost simultaneously with the first interrupt 503 that is generated by the communication system 530. However, it is as well possible that the second interrupt 504 occurs significantly offset in time from the first generated interrupt 503. The duration t2 of hardware timer 512 is freely selectable so that it can be ensured that at least the PLC program 505 of length t1 in application layer 520 is completed before the third interrupt 507 for a scheduler 506 in operating system 510 is generated. In this case, a period of time is allowed to elapse between the end of the PLC program 505 in application layer 520 and the time of triggering interrupt 507 generated by hardware timer 512. This period of time may be considered as a buffer which ensures that there will be no irregularities in the triggering of interrupt 507 for the operating system 510. The hardware timer 512 of FIG. 5 functions as a delay device. Furthermore, hardware timer 512 may be operated in single shot mode. Advantageously, the hardware timer 512 is started in a first third of the duration t1 of application 505. This further improves the stability of the operating system 510 and reduces the probability that an application 505 is not yet completed before another interrupt is generated, for example in time block 502 of communication cycle 531.

With the exemplary embodiment of FIG. 5 a solution is provided which allows for different durations t1 of an application 505 without causing fluctuations to arise in operating system 510. In this case, hardware timer 512 functions as a buffer and ensures constant time intervals until triggering an operating system interrupt 507. In this embodiment, jitter 124 as illustrated in FIG. 1 is highly unlikely as long as duration t2 is chosen so that it ends at least after the point in time at which the PLC program 505 of duration t1 has been terminated. In FIG. 5, a communication cycle 531 comprises two time blocks 501, 502 of equal length, each of which is able to generate one or more interrupts 503.

According to the exemplary embodiments of FIGS. 2 to 5 it may be envisaged that the timing of an interrupt 303, 403, 503 is freely selectable in the entire communication cycle 331, 431, 531. The timing of the interrupt may be specifically selected so that no collisions with or displacements of further interrupts of the operating system will occur. Furthermore, in all embodiments it may be envisaged that a reduction for the second system clock with respect to the first system clock is provided in synchronizing, as already mentioned in conjunction with FIG. 2.

The synchronization of a PLC program 222 with a communication system 230 has been described herein by way of example. Based on the same principles, synchronization may be implemented with other systems, such as a motion kernel.

Furthermore, it may be envisaged that a plurality of communication systems is provided, each one with a second system clock, which second system clocks are synchronized with the first system clock of a common operating system, so that each of the second system clocks will be synchronized with the first system clock. With the same procedure it is in principle possible to simultaneously synchronize any number of systems, for example a plurality of real-time communication systems, motion kernels, and one or more PLC applications with the real-time operating system 210. The systick of the operating system and all further timing is derived from a system clock as explained before, in order to ensure a defined temporal relationship. In order to avoid possible jitter, it is necessary to select the required timing (interrupts) so skillfully that preferably no displacement or interrupting among each other or by the systick of the operating system is produced.

The exemplary embodiments of FIGS. 2 to 5 may furthermore be combined within the scope of the inventive concept. For example, in FIGS. 3 to 5 it is possible to provide more than two time blocks in a communication cycle. Also, more than one of the alternatives of FIGS. 3 to 5 may be separately implemented at the same time in one automation device, for example by switching to different operating modes. It is furthermore possible to combine the different alternatives in one operating mode, for example so that a hardware timer 512 as shown in FIG. 5 is used only in every second communication cycle and at each intermediate communication cycle one of the variations of FIG. 3 or FIG. 4 is employed.

The invention claimed is:

1. An automation device, comprising:
   an operating system having a first system clock for controlling a system time cycle of the operating system;
   a communication system having a second system clock for controlling a system time cycle of the communication system;
   wherein a first interrupt and a second interrupt are generated from the second system clock of the communication system;
   wherein the first interrupt is provided for an application and the second interrupt is provided for the operating system; and
   wherein the first system clock and the second system clock are synchronized in time.

2. The automation device as claimed in claim 1, wherein the operating system is a real-time operating system.

3. The automation device as claimed in claim 2, wherein the first system clock and the second system clock are derivable from the communication system.

4. The automation device as claimed in claim 2, wherein the first interrupt can be used to start the application.

5. The automation device as claimed in claim 2, wherein an interrupt can be provided by an application to the operating system.

6. The automation device as claimed in 2, wherein the timing of an interrupt is freely selectable in the entire communication cycle.

7. The automation device as claimed in claim 1, wherein the first system clock and the second system clock are derivable from the communication system.

8. The automation device as claimed in claim 7, wherein the second interrupt can be used to start a scheduler at the operating system.

9. The automation device as claimed in claim 7, wherein an interrupt can be provided by an application to the operating system.

10. The automation device as claimed in claim 7, wherein the timing of an interrupt is freely selectable in the entire communication cycle.

11. The automation device as claimed in claim 1, wherein the first interrupt can be used to start the application.

12. The automation device as claimed in claim 11, wherein an interrupt can be provided by an application to the operating system.

13. The automation device as claimed in claim 1, wherein the second interrupt can be used to start a scheduler at the operating system.

14. The automation device as claimed in claim 13, wherein the application is a motion control or PLC control application.

15. The automation device as claimed in claim 1, wherein the timing of an interrupt is freely selectable in the entire communication cycle.

16. The automation device as claimed in claim 1, wherein the synchronization includes a reduction with respect to the second system clock relative to the first system clock.

17. The automation device as claimed in claim 1, wherein the automation device comprises a plurality of communication systems, each of which has a second system clock, and wherein each of the second system clocks is synchronized with the first system clock of a common operating system, so that each of the second system clocks is synchronized with the first system clock.

18. The automation device as claimed in claim 1, wherein the automation device comprises a hardware timer which can be employed for synchronizing the first system clock and the second system clock.

19. The automation device as claimed in claim 18, wherein the hardware timer is operable in single shot mode and/or wherein the hardware timer is started in a first third of the time period of the application.

20. A method of operating an automation device which comprises an operating system and a communication system, the method comprising:
providing a first system clock which defines an operating cycle of the operating system;
providing a second system clock which defines an operating cycle of the communication system;
generating a first interrupt and a second interrupt by the second system clock of the communication system;
providing the first interrupt for an application and providing the second interrupt for the operating system; and
synchronizing the first system clock and the second system clock.

* * * * *